J. H. FELMLEE & E. FELUMLEE.
MACHINE FOR WRAPPING PACKAGES.
APPLICATION FILED AUG. 19, 1909.
967,624.
Patented Aug. 16, 1910.
13 SHEETS—SHEET 8.
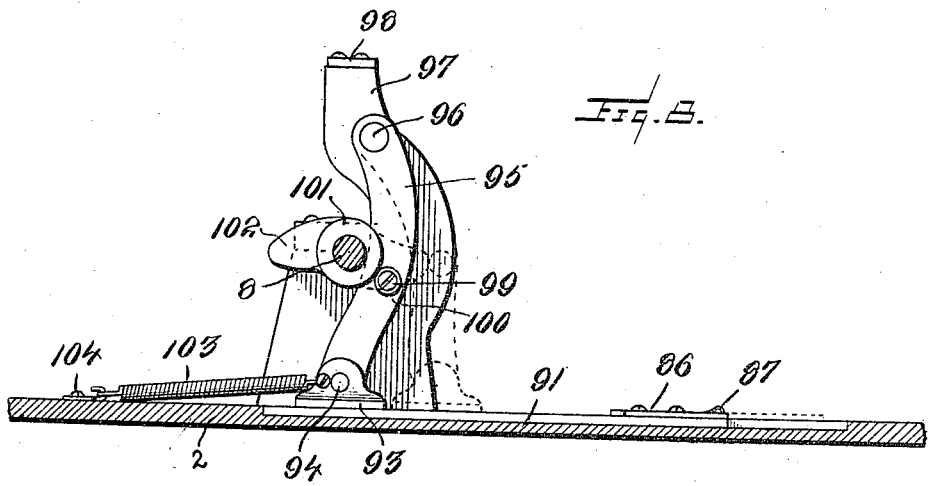
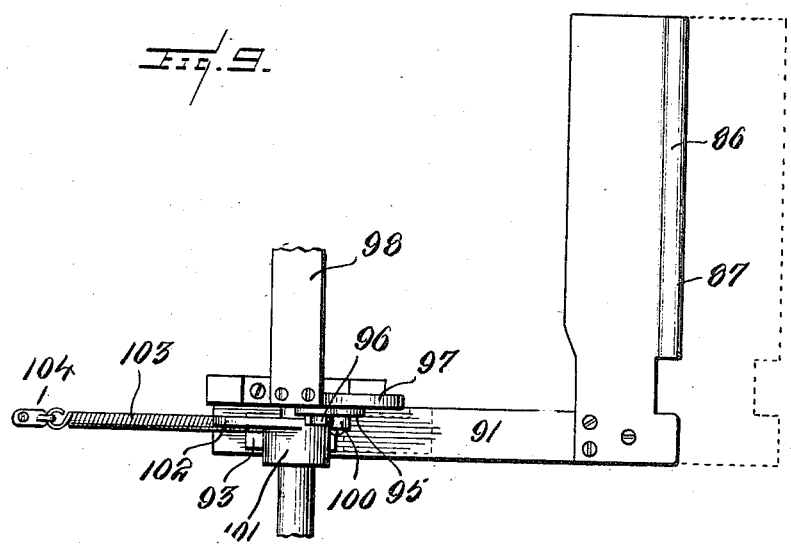
WITNESSES:
INVENTORS
J. H. Felmlee and
E. Felumlee,
BY Franklin H. Hough
Attorney J. H. FELMLEE & E. FELUMLEE.
MACHINE FOR WRAPPING PACKAGES.
APPLICATION FILED AUG. 19, 1909.
967,624.
Patented Aug. 16, 1910.
13 SHEETS—SHEET 9.
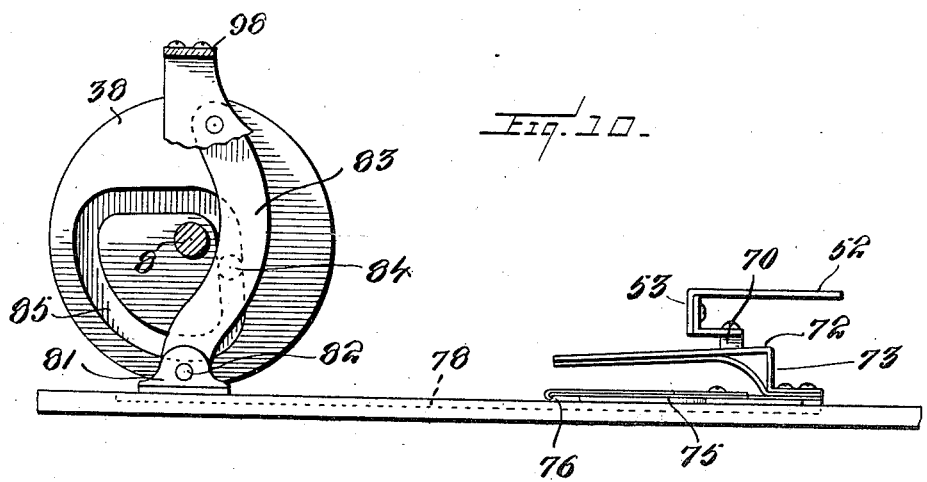
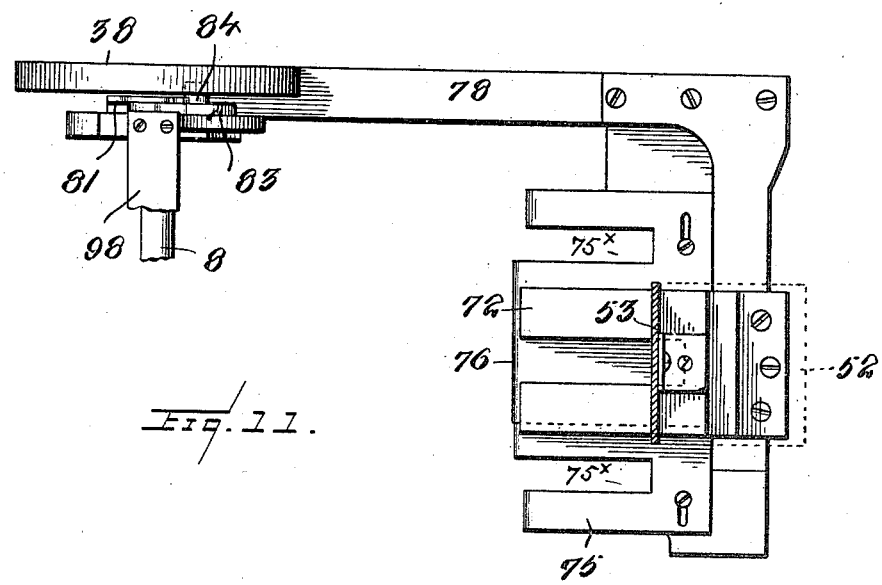

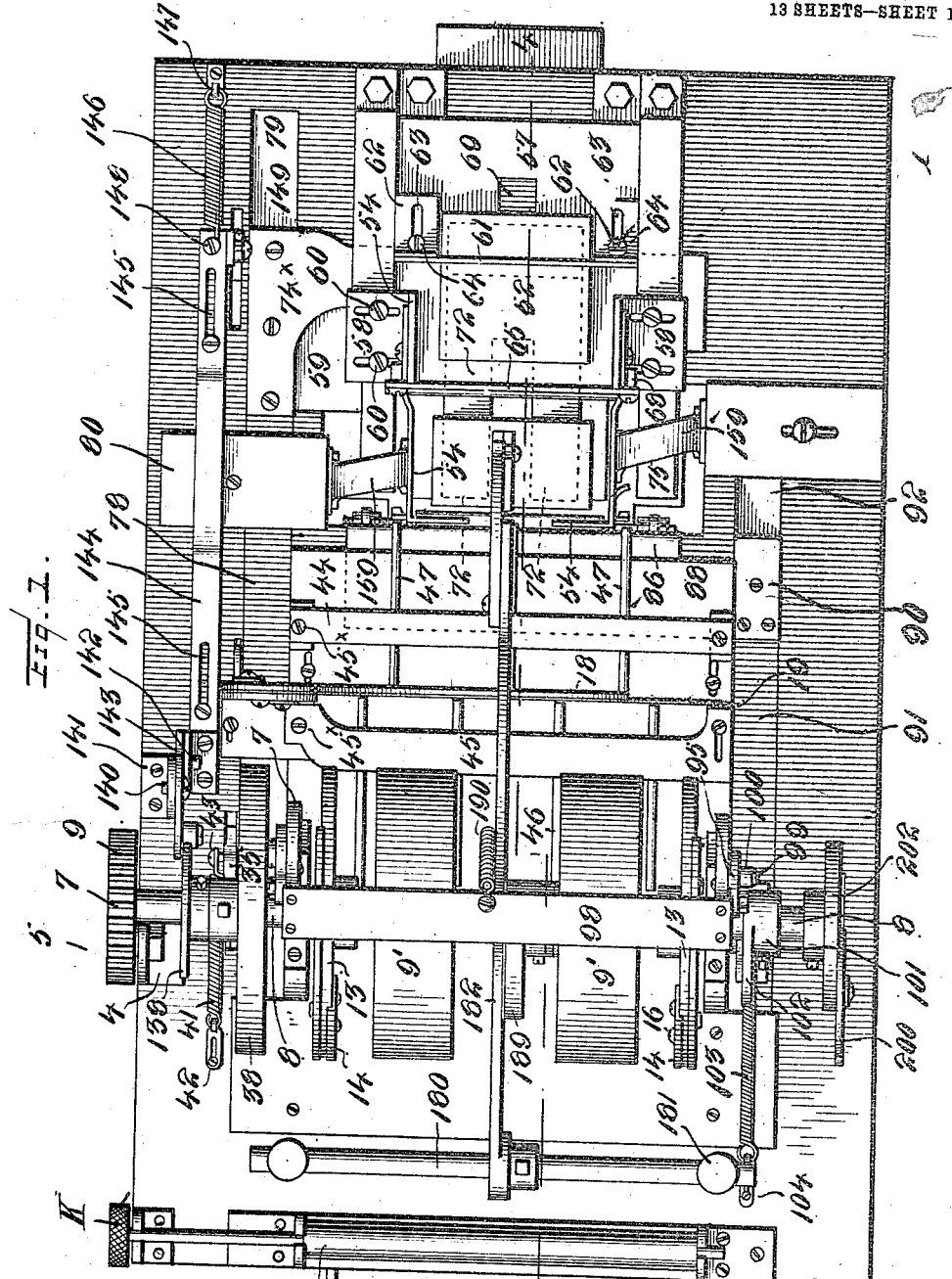

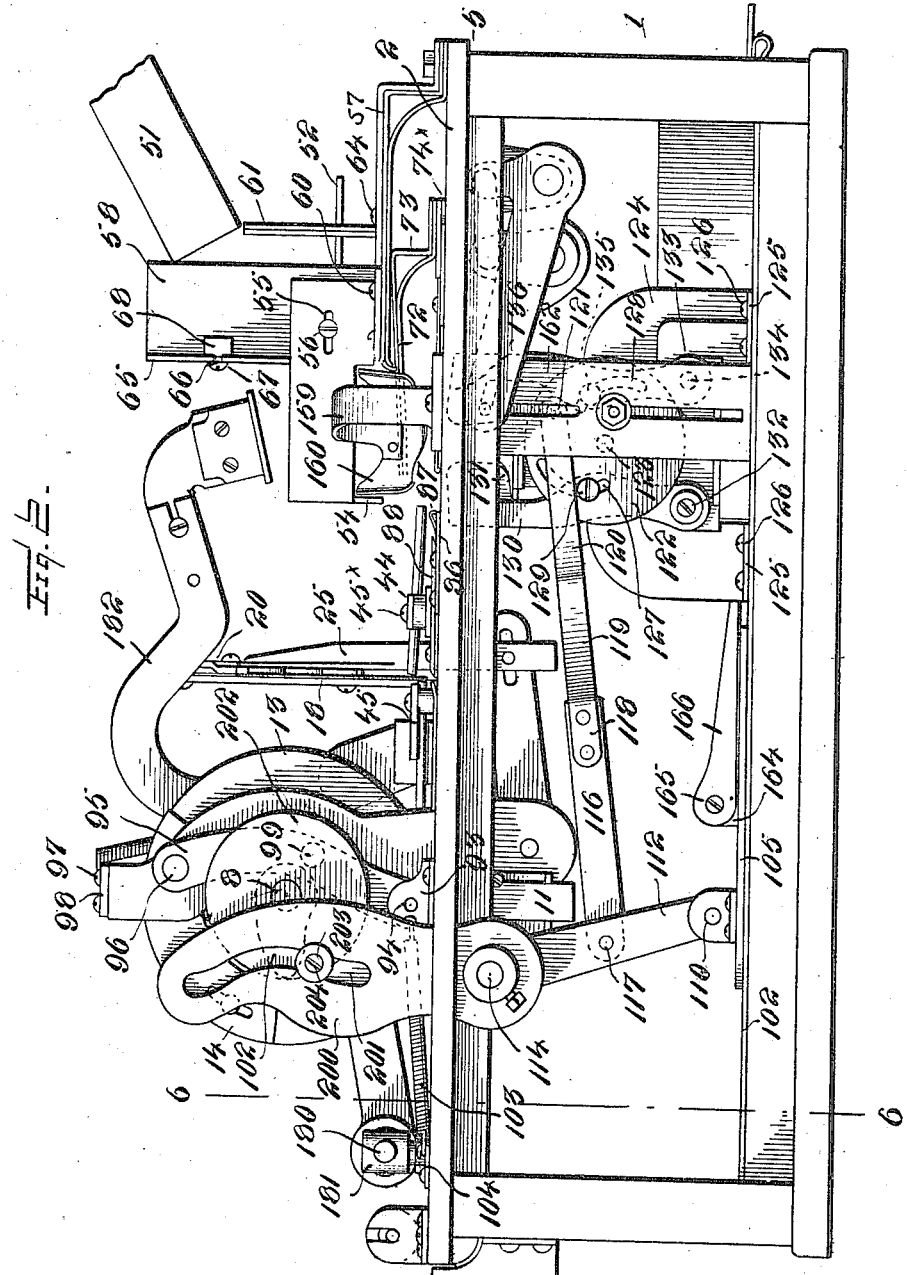

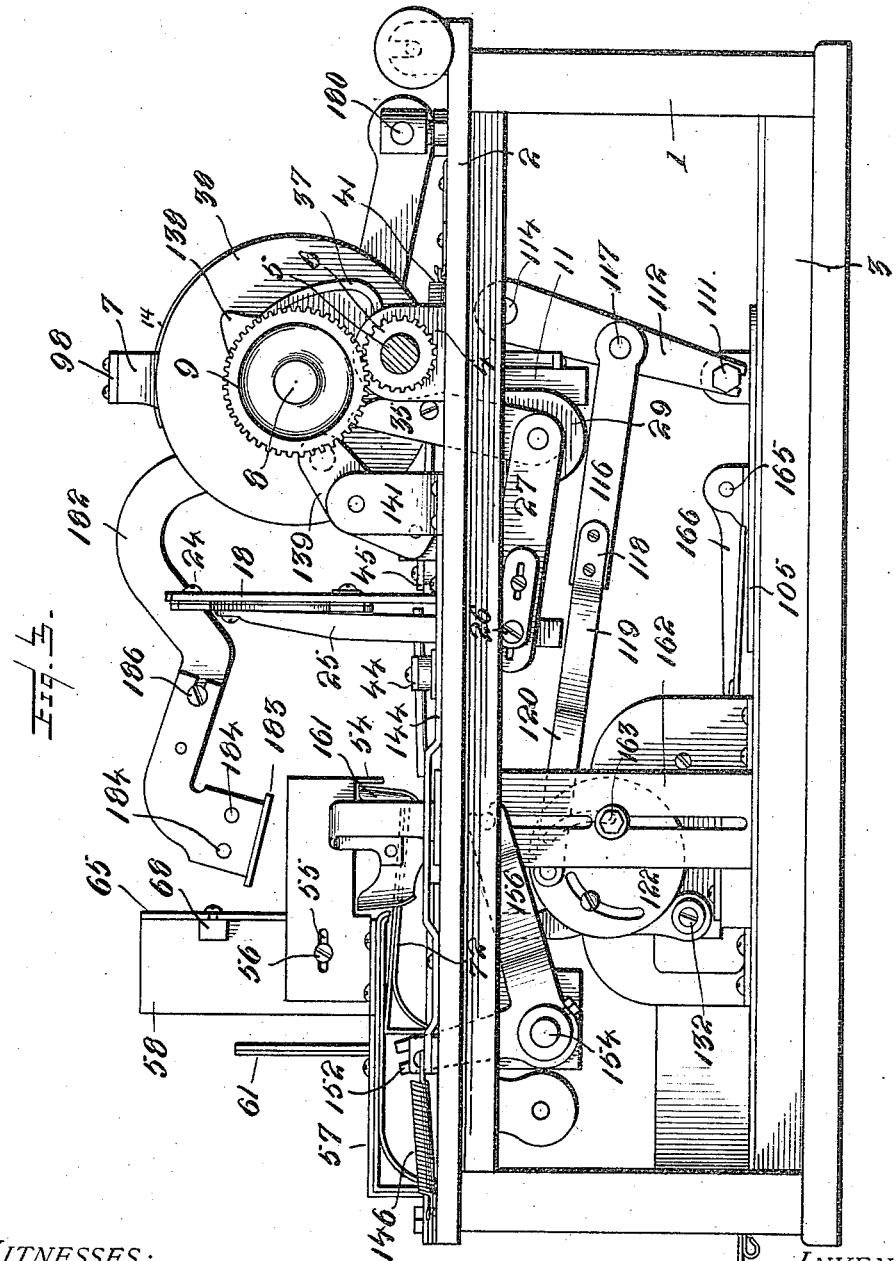

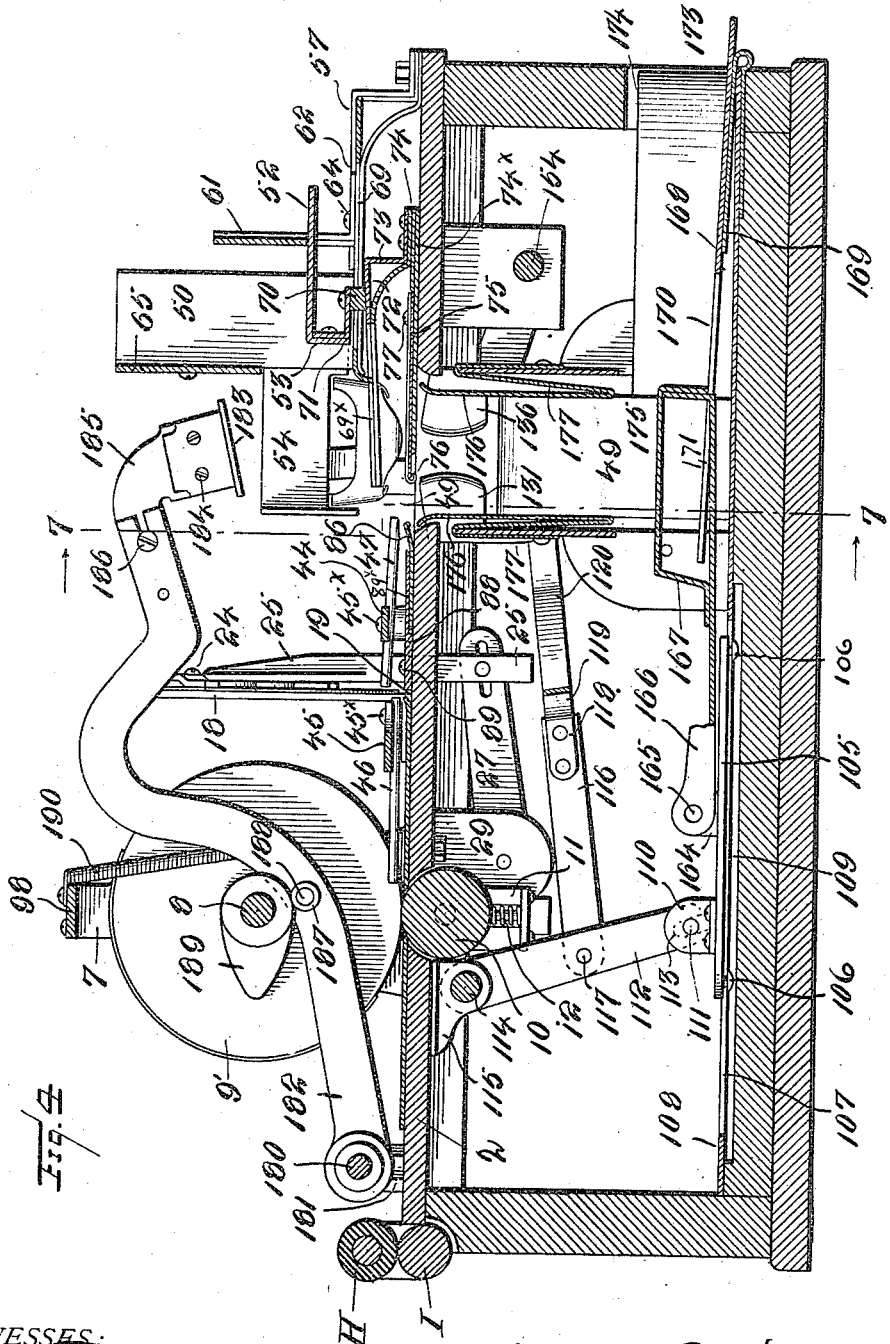

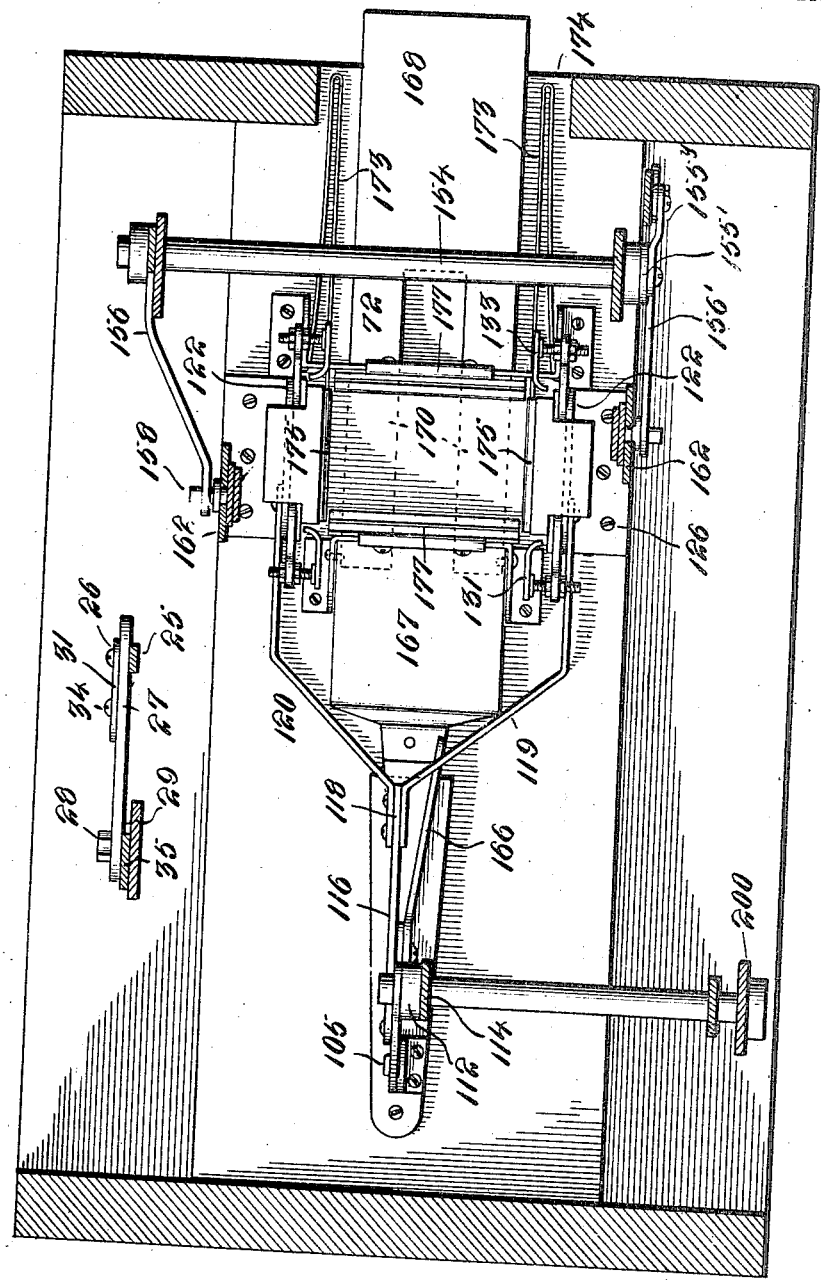

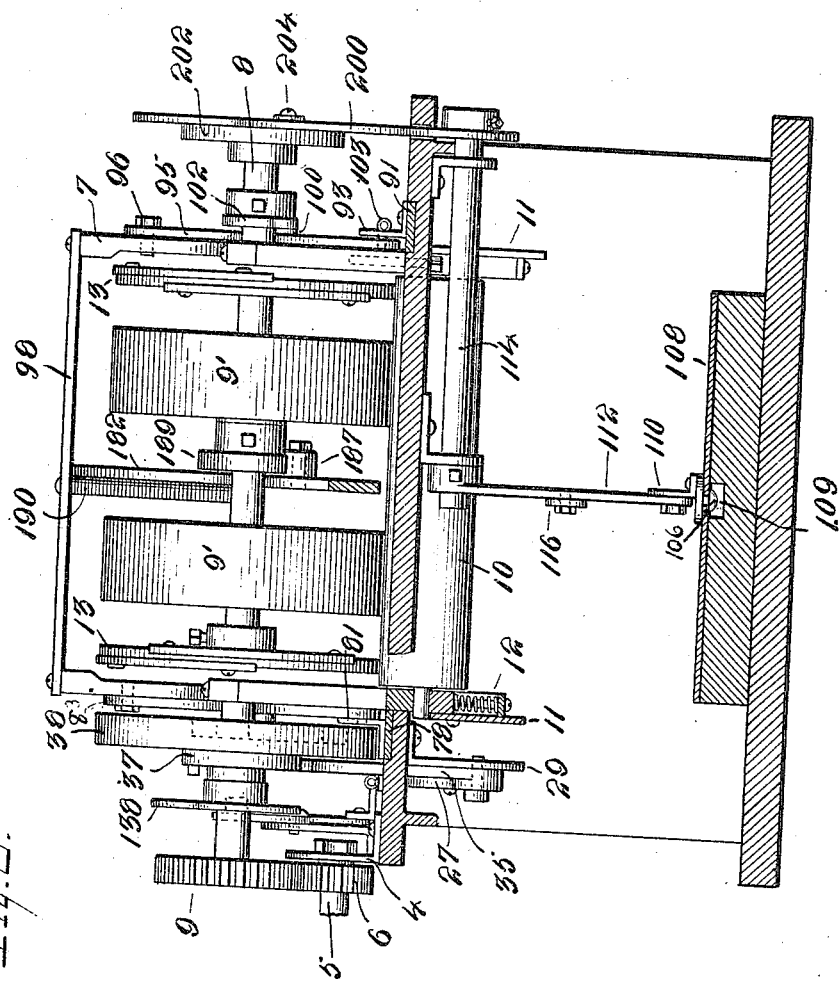

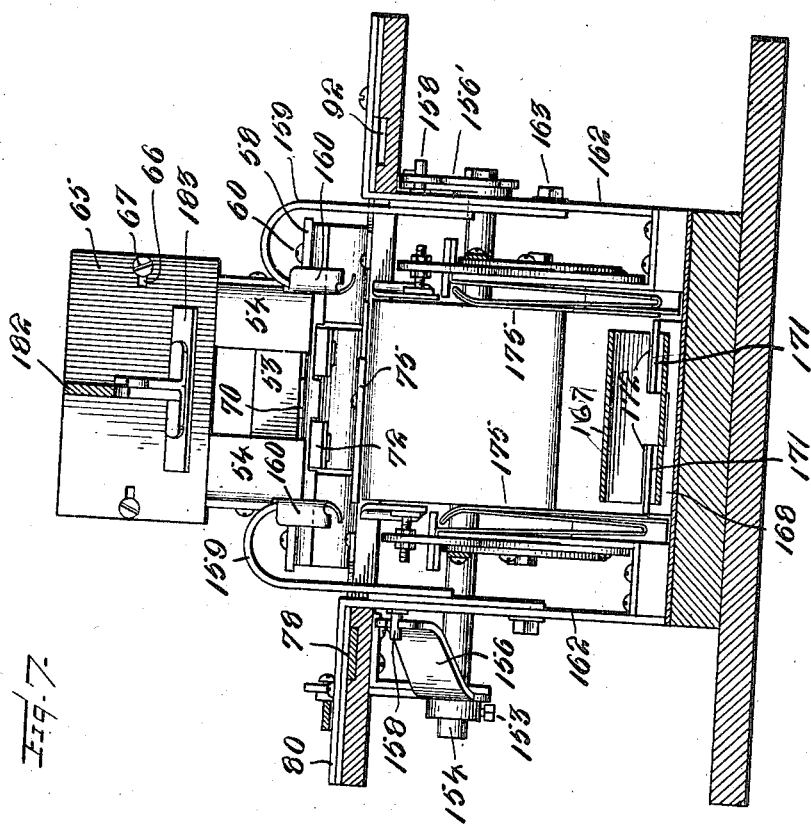

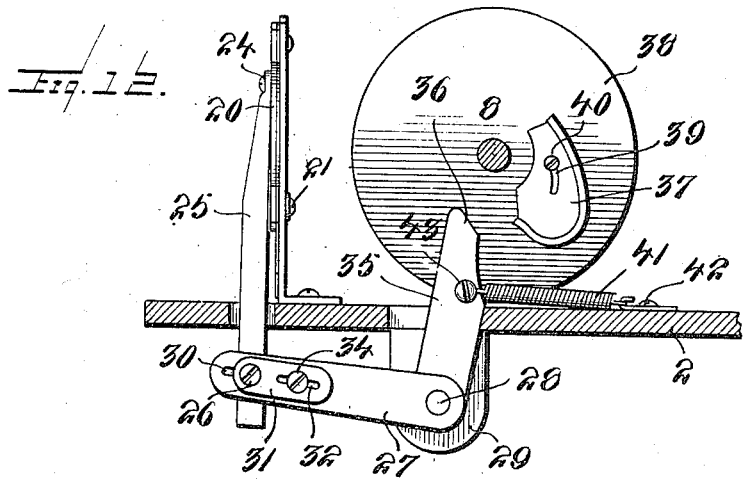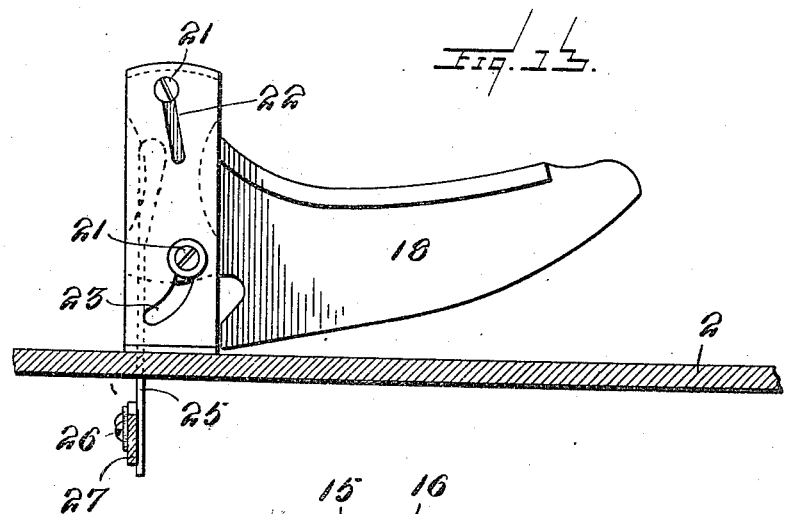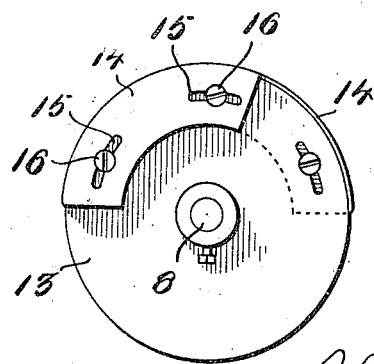

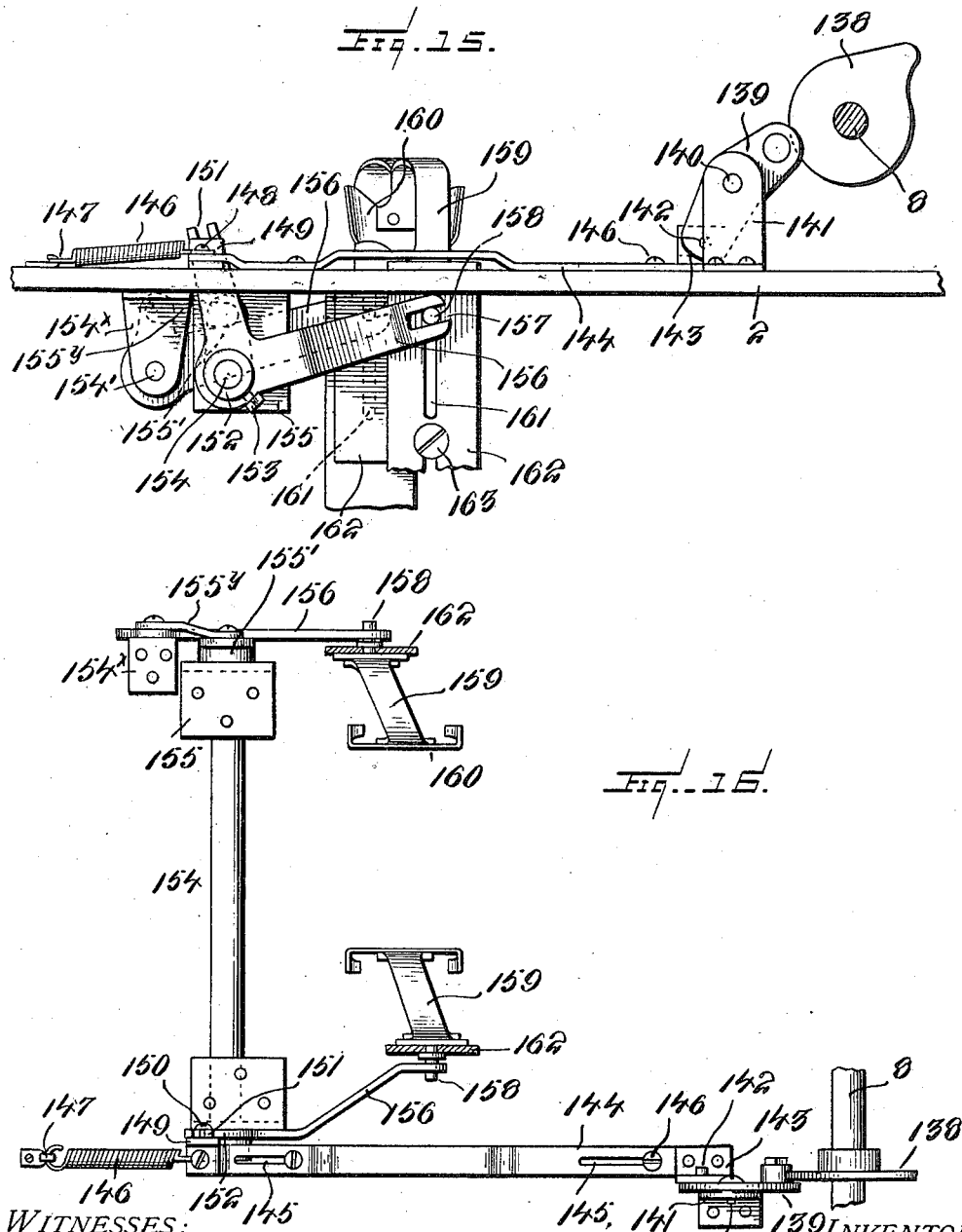

J. H. FELMLEE & E. FELUMLEE.
MACHINE FOR WRAPPING PACKAGES.
APPLICATION FILED AUG. 19, 1909.
967,624.
Patented Aug. 16, 1910.
13 SHEETS—SHEET 12.
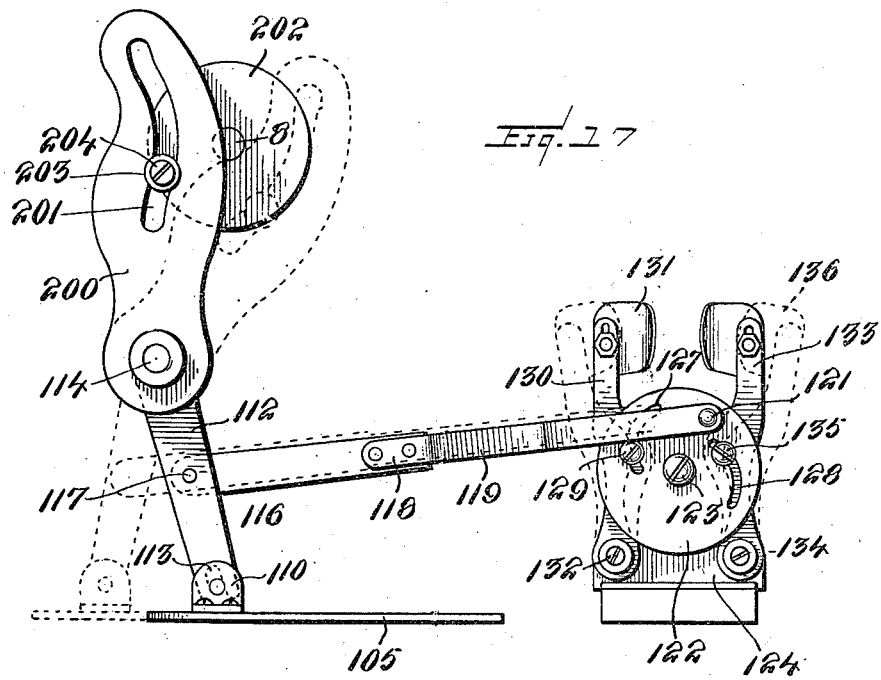
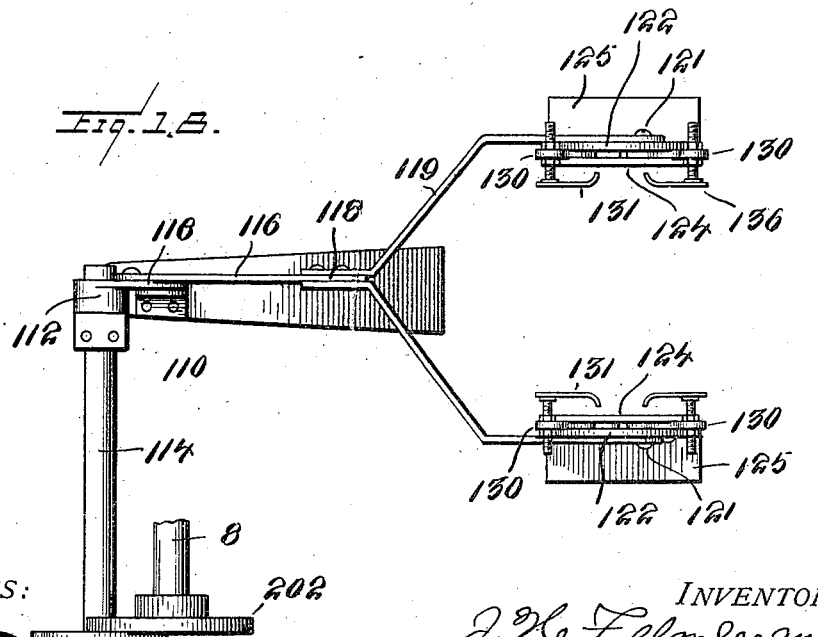
WITNESSES:
INVENTORS
J. H. Felmlee and
E. Felumlee
BY Franklin N. Hough
Attorney

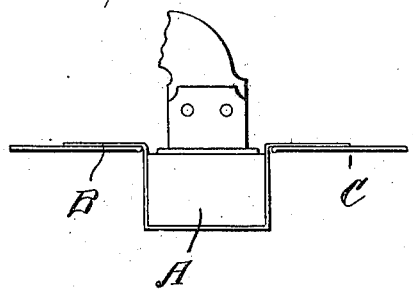
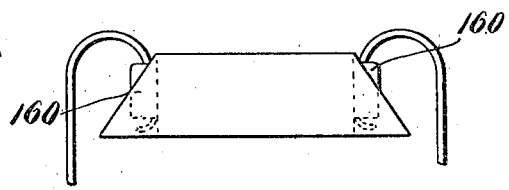
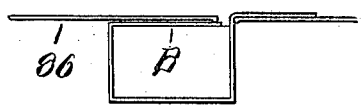
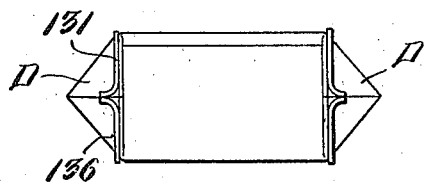
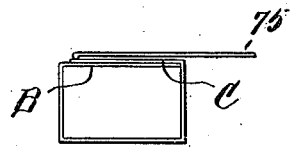
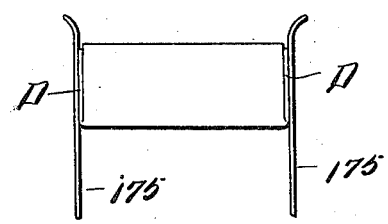

UNITED STATES PATENT OFFICE.

JOHN H. FELMLEE, OF PITTSBURG, PENNSYLVANIA, AND EMANUEL FELUMLEE, OF COSHOCTON, OHIO.

MACHINE FOR WRAPPING PACKAGES.

967,624.      Specification of Letters Patent.      Patented Aug. 16, 1910.

Application filed August 19, 1909. Serial No. 513,583.

*To all whom it may concern:*

Be it known that we, JOHN H. FELMLEE and EMANUEL FELUMLEE, citizens of the United States, and residing, respectively, at Pittsburg, in the county of Allegheny, State of Pennsylvania, and Coshocton, in the county of Coshocton and State of Ohio, have invented certain new and useful Improvements in Machines for Wrapping Packages; and we do hereby declare the following to be a full, clear, and exact description of the invention, such as will enable others skilled in the art to which it appertains to make and use the same, reference being had to the accompanying drawings, and to the letters and figures of reference marked thereon, which form a part of this specification.

This invention relates to new and useful improvements in machines for automatically wrapping articles of various kinds and comprises mechanism which will be hereinafter fully described and then specifically defined in the appended claims.

We illustrate our invention in the accompanying drawings, in which:—

Figure 1 is a top plan view of the invention. Fig. 2 is an elevation of one side. Fig. 3 is an elevation of the opposite side of the machine. Fig. 4 is a central longitudinal section through the apparatus. Fig. 5 is a sectional view taken on line 5—5 of Fig. 2 looking in the direction of the arrow. Fig. 6 is a view taken on line 6—6 of Fig. 2. Fig. 7 is a sectional view taken on line 7—7 of Fig. 4. Fig. 8 is a vertical sectional view showing parts in elevation. Fig. 9 is a top plan view of the details shown in Fig. 8. Fig. 10 is a detail in elevation. Fig. 11 is a top plan view of the details shown in Fig. 10. Fig. 12 is a sectional view through the top of the frame of the apparatus showing the knife-actuating parts in elevation. Fig. 13 is a detail view in elevation of the cutting knife. Fig. 14 is a detail view of means for regulating the feeding of the paper. Fig. 15 is a detail view showing the means for folding the upper end flaps of a parcel. Fig. 16 is a top plan view of the detailed construction shown in Fig. 15. Fig. 17 is an enlarged detail in elevation showing the manner of operating the edge folding flaps. Fig. 18 is a top plan view of the construction shown in Fig. 17, and Figs. 19, 20, 21, 22, 23 and 24 are views showing the different steps in the folding of a parcel.

Reference now being had to the details of the drawings by numerals, 1 designates the frame of the apparatus having a table 2 which is spaced apart from the platform 3 upon which a portion of the operative mechanism is supported. Mounted in a bracket member 4 upon said table is a stub shaft 5 to which is fixed a pinion 6 which may be rotated by any source of power not shown. Mounted in suitable bearings in the standards 7 rising from the table is a shaft 8 to one end of which is fixed a gear wheel 9 in mesh with the pinion 6 and affording means whereby power may be transmitted from the pinion to the shaft. Fixed to the shaft 8 are the two friction paper feeding rolls 9′, shown clearly in Fig. 1 of the drawings, and which coöperate with a cylindrical roller 10, shown clearly in Fig. 4 of the drawings, which roller 10 is journaled in yielding bearings 11 mounted upon the springs 12, affording means whereby said roller 10 may be depressed by mechanism which will be presently described for the purpose of causing a momentary stop in the feeding of the wrapping paper while the same is being cut off. Fixed to the shaft 8 are the disks 13, shown in top plan view in Fig. 1 of the drawings and one mounted upon the outside of each friction feeding wheel 9′, and fixed to each disk 13 are the segment plates 14 having each a slot 15 therein, and 16 designates screws which are fastened to the disk 13 and afford means whereby said segments may be adjusted longitudinally accordingly as it may be desired to regulate the duration at which it is desired to cause the feeding of the paper to cease during the operation of the apparatus. It will be noted that the outer marginal edges of said segments 14 project beyond the circumferences of the disks upon which they are mounted.

It will be noted upon reference to Figs. 1 and 14 of the drawings that the segment plates 14 are arranged in pairs with their inner ends overlapping and upon opposite sides of the disk to which they are attached. When the portions of the segment plates which project beyond the circumferences of the disk contact with the spring-pressed feeding roller 10, the latter will yield and move from contact with the friction feeding wheels 9' whereby the sheet of paper being fed between the rollers 9' and 10 will be at rest momentarily, for a sufficient time to allow the paper to be severed by the knife 18. Said knife, an enlarged detail view of which is shown in Fig. 13 of the drawings, is adapted to have a draw cut and has a play through a slot 19 in the table 2 (see Fig. 4 of the drawings), but not a shearing cut, it being understood that the paper which is fed over said slot upon the table will be held by sufficient tension means intermediate the feeding rollers and the portion upon which the article to be wrapped is held to allow the paper to be readily severed by the draw cut imparted to the knife. Said knife has a plate 20 fastened to its butt end to which headed screws 21 are fastened and which screws project through the cam slots 22 and 23, formed one above the other in the knife, as shown in Fig. 13 of the drawings, the former of which slots is straight and inclined for the reception of said screws while the lower slot 23 is curved longitudinally.

Pivotally mounted upon a pin 24 which is fastened to the plate 20 is a link 25 which is given a vertical reciprocating movement by its sliding pivotal connection with the pin 26 which is carried at the end of the crank arm 27, shown clearly in Fig. 12 of the drawings, and which crank arm is fastened to a pivotal pin 28 journaled in the bracket arm 29 underneath the table 2. It will be noted that the pivot pin 26 has a vertical adjustment in a slot 30 formed in the arm 27, the pin 26 being carried by the plate 31 which is slotted as at 32 for the reception of the screw 34 which is carried by the arm 27. By the provision of the said adjustment of the arm 27, the operation of the knife may be regulated for a predetermined movement.

Fixed to the pivot 28 is an arm 35 which projects substantially at right angles to the arm 27 and has an inclined portion 36 positioned in the path of the cam 37 projecting from the face of a disk 38, which is keyed to the shaft 8 and which cam has an elongated slot 39 formed therein through which a screw 40 carried by the disk 38 projects. By the provision of said cam, it will be noted that at each revolution of the disk and shaft carrying the same the link 25 will be drawn down and returned to its normal position and which movement will cause the knife to be swung down through the slot 19 and sever a sheet of paper which has been previously fed thereover. By the provision of the slots 22 and 23 in which the pins 21 move as the knife is drawn downward, it will be noted that a draw cut will be imparted to the cutting edge of the knife.

A spring, designated by numeral 41, is fastened to a hook 42 upon the table 2 and its other end fastened to a pin 43 upon arm 35 and affords means for returning the arm 35 and the knife to their normal positions, as shown in Fig. 13 of the drawings.

Fastened to the table 2 and spaced apart a slight distance by the upper surface thereof are the two plates 44 and 45, shown in Fig. 1 of the drawings and parallel to each other and in section in Fig. 4, said plates being held by means of screws 45ˣ in substantially horizontal positions, and 46 designate fingers which are fastened to the under surface of the plate 45 and have their rear ends positioned adjacent to the feed rollers while their forward ends are positioned adjacent to the slot 19 and fingers 47 are fastened to the under side of the plate 44 and are slightly inclined with relation to the surface of the table and their forward ends terminate, as shown in Figs. 1 and 4 of the drawings, adjacent to the marginal edge of the opening 49 in which the parcels are adapted to be wrapped. Said plates 44 and 45, with the bars fixed thereto, serve to guide the wrapping paper as it is fed forward upon the table over the well.

Mounted upon the table is a hopper 50 into which the articles to be wrapped are adapted to be fed in any suitable manner, such as through the medium of an inclined chute 51, as shown in Fig. 2 of the drawings, and upon the supporting plate and plunger 52 which has its forward end 53 bent at an angle and serves as a plunger to feed an article to be wrapped between the angled plates 54 fastened to angle portions of the hopper 58, each of said angle plates 54 having a slot 55 through which a screw 56 fastened to the hopper is adapted to pass, thus affording a means of adapting the hopper to the particular size of article to be wrapped. The lower ends of the opposite sides of said hopper are angled as at 58, said angled ends having slots 59 therein for the reception of the screws 60 which are fastened to the table 57. The rear wall of the hopper, designated by numeral 61, comprises an angle plate, the lower end of which has lateral extensions 62 which are slotted as at 63 and screws 64 are fastened to the platform 57 and extend through the slots 63 and are adapted to hold the wall 61 in an adjusted position. The front wall 65 of the hopper is provided with slots 66, one in each end, and through each of which an adjusting screw 67 is adapted to pass, which screws are fastened in suitable projections 68 upon the sides 58 of the hopper. By these adjusting features upon the hopper, it will be noted that the same may be readily adapted for receiving articles of different sizes to be wrapped.

Upon reference to Fig. 1 of the drawings, it will be noted that the table 57 is provided with a longitudinal slot 69 in which the block 70 is adapted to reciprocate, which block is fastened to an angle plate 71 which in turn is secured to the plunger 52. Said block 70 is fastened to the forked plate 72, the rear portion of which is angled as at 73, shown in Fig. 4 of the drawings, and which is fastened to a plate 74ˣ by means of the screws 74. A top folding blade 75 is fastened to the plate 74ˣ by means of screws 77 and its forward end 76 is preferably rounded. Said blade 75 has slots or openings 75ˣ in its forward edge.

Fixed to the under surface of the plate 74ˣ is a reciprocating bar 78 which is held in place within the recess 79 in the table by means of a plate 80 fixed to the latter and extending over said recess. Fastened to the rear end of the bar 78 which is connected to the plate 74ˣ is an angle plate 81 having a pivotal pin 82 therein, as shown clearly in Fig. 10 of the drawings, and 83 designates a curved lever pivotally mounted upon the pin 82 and carrying a roller 84 which is adapted to travel in a cam outlined groove 85 formed in the inner face of the disk 38, thus forming means whereby, as the disk 38 rotates, a reciprocating motion may be imparted to the folding blade 75 and the plunger plate 52.

Mounted to have a horizontal movement upon the table is a top folding blade 86, the forward end 87 of which is preferably rounded, and said blade 86 reciprocates underneath a plate 88, which is recessed upon its under surface as shown 89ˣ in Fig. 4 of the drawings and is fastened to the table by means of screws 89. Fixed to a projecting end 90 of the folding blade 86 is a reciprocating bar 91, shown in Fig. 1 of the drawings, and which has a longitudinal movement in a recess 92 formed in the upper surface of the table. Fixed to the bar 91 is an angled blade 93 carrying a pivot pin 94 to which pivot pin a link 95 is pivotally connected as shown in Figs. 4 and 6, said link 95 also being pivotally connected to a pin 96 carried by the standard 97 which has a cross-piece 98 fastened thereto. A pivot pin 99 is carried by the link 95 and upon said pin 99 is mounted an anti-friction roller 100. Fixed to the shaft 8 is a collar 101 having a finger 102 projecting therefrom in the path of which said anti-friction roller 100 is mounted and serving to cause the link 95 to swing upon its pivot 96 at each revolution of the shaft as the finger comes in contact with the anti-friction roller 100, thus causing the folding blade 86 to move forward at a pre-determined moment, immediately after the folding blade 75 has moved forward over the opening or well in which the article is to be wrapped and has returned to its starting position. By these two movements of the blades 75 and 86, the two upright ends of a wrapper are adapted to be folded one over the other. A spring 103 is fastened at one end to the angle blade 93 and its other end to a hook 104 secured to said table and serves to normally return the bar 91 after having been driven forward by the projecting finger 102.

Referring to Fig. 15 of the drawings will be seen a cam 138 fixed to the shaft 8, and 139 is a pivotal lever mounted upon a pin 140 carried by the bracket arm 141 supported upon the table 2 and said lever 139 carries a pivotal pin 142 which engages an aperture in an angled plate 143 fixed to the longitudinally movable bar 144, shown clearly in Figs. 1 and 15 of the drawings. The bar 144 has elongated slots 145 through which the screws 146 fixed to the table pass and serves as means for guiding the bar 144 in its longitudinal movements. A spring 146 is fastened at one end to the hook 147 and its other end to a screw 148 which is fastened to the bar 144 provided for the purpose of returning the bar 144 to its normal position after having been driven forward by the tilting movement of the lever 139. Fixed to the bar 144 is an angle plate 149 to which a screw 150 is fastened which projects through a slot 151 formed at the upper end of the angle lever 152, which latter is fastened by means of a set screw 153 to the rock shaft 154 journaled in hangers 155 depending from the under surface of the table. The arms 156 of said angle levers 152 are slotted as at 157 and are adapted to receive the screws 158 which project from the shank portions 159 of the top folding blades 160. The screws 158 are adapted to have a vertical play in the elongated slots 161 formed in the upright plates 162 fastened at its lower end to the bed and its upper end to said table, and a headed screw 163 is fastened to the shank portion 159 of each blade 160 serving to hold the same in proper vertical position as they reciprocate. It will be noted that the upper part of each shank portion 159 is spirally bent in order to bring the blade carried thereby in proper position at the ends of the opening in which the article is to be folded. Each blade 160 is adapted, as it moves up and down, to pass through one of said slots or openings 75ˣ in the horizontally disposed folding blade 75. A second angle lever 156' is pivotally mounted upon a pin 154' which is journaled in a bracket arm 154ˣ and 155ʸ designates a link pivotally connecting the lateral projection of the angle lever 156 with a crank arm 155', shown in dotted lines in Fig. 15 of the drawings, and which crank arm is fixed to the shaft 154. The end of the arm of the lever 156 is connected to the shank portion of a second folding blade 160 which has the same connection therewith as has the folding blade above described and which is actuated by the arm 161. It will be noted that the straight and vertically reciprocating shank portions of the two top folding blades 160 are mounted one in advance of the other and, by the provision of the crank arm and link connection 156 and 155', the throw of the two blades will be uniform.

Referring to Fig. 4 of the drawings will be seen a plate 105 resting upon a plate 108 and having headed lugs 106 projecting from the lower surface thereof, the shank portions of said lugs having a play in an elongated slot 107 formed in said plate 108 which is fastened to the bottom of the frame, a recess 109 being provided underneath the plate 108 in order to allow the lugs 106 to move freely without interference with the bottom of the frame. Fastened to the bar 105 is an angle plate 110 carrying a pivot pin 111, and 112 designates a lever having a slotted end 113 straddling the pivot 111 and its upper end is pivotally mounted upon a rock shaft 114 journaled in the bracket arm 115 upon the under side of the table. A link 116 is mounted at one end upon a pivot 117 and its other end is fastened to the slotted end 118 of the forked member 119, the arms 120 of which are adapted to be fastened each to a pivot pin 121 fastened to a disk 122 adapted to rock upon a pivot 123, which pivots are mounted upon the upright portions 124 of the angle plates 125, which latter are fastened by bolts 126 to the base of the machine, as shown clearly in Fig. 2 of the drawings. It will be noted that each of the disks 122 is provided with two curved slots 127 and 128, in the former of which a screw 129 is adapted to have a play, which screw is fastened to the bar 130 carrying an edge flat folding blade 131, the bar 130 being mounted upon a pivotal screw 132 fastened to the upright portion 124 of the angled plate 125. A similar bar, designated by numeral 133, is mounted upon a pivot 134 and carries a screw 135 movable in the slot 128 and said bar 133 has a folding arm 136 cooperating with the folding blade 131 to fold in the two opposite side flaps about a parcel.

Fixed to the shaft 114 is a plate 200, shown clearly in Fig. 2 of the drawings, which is provided with a cam slot 201, and 202 designates a disk which is keyed to the shaft 8 and carries a stub pin or screw 203 having journaled eccentrically thereon an anti-friction roller 204 which is mounted in the slot 202. As the shaft 8 rotates, the anti-friction roller 204 will cause the plate 200 to oscillate and also the shaft 114 to which it is fixed to rock, and, as the lever 112 is fixed to the shaft 114, said lever 112 will swing and, through its connection with the shank portions 130 of the edge folding blades, cause said edge folding blades to operate.

Fixed to the lug 164 which rises from the plate 105 is a pin 165 to which one end of the plunger beam 166 is pivoted, said plunger beam having a plunger 167 at its forward end and which plunger has openings 172 in its free end and is adapted to reciprocate through the well 49 for the purpose of pushing an article, having been folded, upon the plate 168, which latter has a spring 169 bearing yieldingly against the same. The inner end of said plate 168 is forked as at 170, shown clearly in Fig. 7 of the drawings, the arms 171 of said forked plate having a play in the spaces 172 formed in the inner end of the plunger. Said plate 168 is adapted to yield slightly in order to adapt itself for satisfactory work in wrapping articles of different thicknesses. Mounted upon each side of the passageway in which the plate 168 is mounted are the two yielding springs 173, shown clearly in Fig. 4 of the drawings, and which serve to bear yieldingly against the folded ends of a wrapper as the article is pushed by the succeeding one through the exit end 174 of the apparatus.

The walls of the well 49 are made up of the resilient plates 175 which are opposite each other and the yielding plates 176 upon the opposite walls, suitable springs 177 bearing yieldingly against the plates 176.

Referring to Fig. 4 of the drawings will be seen a shaft 180 mounted upon standards 181 rising from the table and 182 is a plunger lever, the forward end of which has a head 183 adapted to depress an article to be folded into the well. Said head 183 has an adjustment through the medium of the screws 184 fitting in the slots in the plate 185 which in turn is adjustably held by means of the screw 186 upon the lever 182. An anti-friction roller 187 is mounted upon a pivot 188 carried by the lever 182, and 189 is a cam fixed to the shaft 8 and adapted at each revolution of the shaft to contact with the roller 187 to cause the lever 182 to be depressed, a spring 190 which is fastened at one end to the lever 182 and its other end to the cross-piece 98 serving to return the lever to its highest position after having been depressed.

Referring to Figs. 19 to 24 inclusive, I have shown in Fig. 19 the first act in the operation of the machine in which an article A has been placed upon a sheet of wrapping paper B and depressed by the plunger into the well with the first flaps to be folded. In Fig. 20 the blade 86 has been moved forward to fold the flap B against the upper surface of the article. In Fig. 21, I have shown a second flap folding blade 75 as having folded over the flap C upon the top of the folded flap B, after which the upper edge flaps are folded down, as shown in Fig. 22, by means of the two downwardly moving folding blades 160, afterward the article being folded appears in the manner shown in Fig. 23 in which the edge flaps are folded toward each other and against the ends of the article by means of the end folding blades 131 and 136 which move simultaneously toward each other against the opposite ends of the article. The article after having thus been acted upon by the mechanism will appear with all the flaps, excepting the end ones, designated in Fig. 23 by letter D, yet to be folded and these flaps are folded by depressing the article thus far wrapped between the yielding walls 175. As the plunger moves against the article thus folded, it is pushed forward upon the plate 168, the yielding walls 173 still bearing against the folded flaps and holding them securely until the article is finally ejected from the apparatus.

In operation, the parts are adjusted to act at predetermined moments as will be readily understood and, when the wrapping paper in the form of a web is fed forward a suitable distance over the well, the raised portions of the segments 14 come in contact with the friction feed roller 10 to cause the latter to be depressed, thus momentarily stopping the feeding of the paper during the severing of the latter which is accomplished by the knife 18 which is drawn down by the link 25 through the medium of the levers 27 and 35, which latter is tilted by the cam 37. The wrapping paper having been severed by a draw cut imparted to the knife through the mechanism shown, the spring 41 will serve to return the knife to its normal position. The articles to be wrapped are fed to the hopper in any suitable manner, as by means of an inclined chute, and dropping upon the plunger plate 52 are fed forward and deposited upon the shelf 57 immediately in advance of the plunger 52 and on the forward movement of said plunger 52 the article is deposited upon the wrapping paper which has been previously fed forward in the manner described. When the article is driven forward to its farthest limit, it is pushed over the shelf 69 and upon the plate 72 which moves with the plunger 52 and, as the plunger 52 pushes the article forward, a following article to be wrapped will be supported by the plate 72. Upon the return of the plunger 52 to its outer normal position, the plate 72 will be withdrawn from under the article and deposit the same upon the wrapping paper. As the paper is fed over the top of the well, the opposite ends to be folded will be resting upon the latter and the article to be folded is deposited upon the wrapping paper which will have a tendency to support the article temporarily until the plunger moves down against the article and pushes the same down with the wrapper underneath it into the well to assume the positions shown in Fig. 19 of the drawings.

This having been accomplished, a further rotary movement to the main operating shaft will cause the lever 82 to be depressed and the plunger head 183 coming in contact with the upper surface of the article will depress the latter and the wrapping paper underneath the same down within the well to a position so that the upper surface of the article will be below the folding blades 86 and 75. Upon a further rotary motion of the main shaft 8, the folding blade 86 will be moved forward against the first upright flap of the wrapping paper causing the same to be folded down against the article, after which the folding blade 75 will be moved forward through the medium of the connections shown and described, causing the two upright flaps to be folded against the article. Immediately after the blade 75 has been fed forward, the folding blades 160 will be moved downward against the flaps and fold the same down to the position shown in Fig. 22 of the drawings, leaving the two side flaps to be folded in which is accomplished by the movement of the folding blades 131 and 136 toward each other, the operation of which blades will leave the wrapped article in the form shown in Fig. 23 with the last flaps only to be folded and which latter is accomplished by a succeeding article being pushed down by the plunger head 183, thus causing the last flaps to be folded as they bear against the yielding walls of the well. Immediately after the folding blades 160 rise above the plane in which the wrapping paper is being fed forward, the latter will move forward over the folding blade 86 and the well and be in position to receive the next article which is deposited upon said wrapping paper as the plate 72 is drawn from thereunder. After the article has been fully wrapped, the plunger 167 is driven forward to push the same out of the well and upon the plate 168 from which article after article is ejected and may be conveniently carried to any suitable location.

In the event of the paper running unevenly, it may be regulated by means of the tension friction rollers H and I, the former of which is provided with a suitable handle K, shown in Fig. 1 of the drawings.

What we claim to be new is:—

1. An automatic apparatus for wrapping articles, comprising a frame with a wrapping well therein having yielding walls, means for feeding a wrapper over said well, a plunger for feeding an article to be wrapped and depositing the same upon said wrapping paper, a horizontally movable folding blade movable with said plunger and having openings in the edge thereof, means fastened to and projecting in advance of the plunger for supporting a following article to be wrapped, a second horizontally disposed movable folding blade, top folding blades movable through the openings in said horizontally disposed blade, edge folding blades movable underneath the horizontally disposed blade with openings therein, and means for ejecting the folded article.

2. An automatic apparatus for wrapping articles, comprising a frame with a wrapping well therein having yielding walls, means for feeding a wrapper over said well, a plunger for feeding an article to be wrapped and depositing the same upon said wrapping paper, a horizontally movable folding blade movable with said plunger and having openings in the edge thereof, means fastened to and projecting in advance of the plunger for supporting a following article to be wrapped, a second horizontally disposed folding blade, top folding blades movable through the openings in said horizontally disposed blade, edge folding blades movable underneath the horizontally disposed blade with openings therein, a yielding plate in the bottom of the well, and means for ejecting a wrapped article.

3. An automatic apparatus for wrapping articles, comprising a frame with a wrapping well therein having yielding walls, means for feeding a wrapper over said well, a plunger for feeding an article to be wrapped and depositing the same upon said wrapping paper, a horizontally movable folding blade movable with said plunger and having openings in the edge thereof, means fastened to and projecting in advance of the plunger for supporting a following article to be wrapped, a second horizontally disposed movably folding blade, top folding blades movable through the openings in said horizontally disposed blade, edge folding blades movable underneath the horizontally disposed blade with openings therein, a yielding plate in the bottom of the well, a spring bearing against said plate and against which latter the articles being folded are depressed, and means for ejecting a folded article.

4. An automatic apparatus for wrapping articles, comprising a frame with a wrapping well therein having yielding walls, means for feeding a wrapper over said well, a plunger for feeding an article to be wrapped and depositing the same upon said wrapping paper, a horizontally movable folding blade movable with said plunger and having openings in the edge thereof, means fastened to and projecting in advance of the plunger for supporting a following article to be wrapped, a second horizontally disposed folding blade, top folding blades movable through the openings in said horizontally disposed blade, said folding blades movable underneath the horizontally disposed blade with openings therein, a slotted plate extending into the lower portion of said well, and an ejecting plunger having openings through which the ends of said slotted plate are adapted to pass, and a spring bearing against the under surface of the plunger.

5. An automatic apparatus for wrapping articles, comprising a frame with a wrapping well therein having yielding walls, means for feeding a wrapper over said well, a plunger for feeding an article to be wrapped and depositing the same upon said wrapping paper, a plate movable upon said frame, a horizontally disposed folding blade fixed to said plate and having openings in its free edge, a horizontally disposed article supporting plate upon said plunger and above the latter, a plate underneath the plunger and adapted to receive a following article to be wrapped, a second horizontally movable folding plate movable over said well, top folding flaps movable through the openings in said first mentioned blade, edge folding blades movable toward each other while one of the horizontally disposed blades is positioned over the well.

6. An automatic apparatus for wrapping articles, comprising a frame having a well therein, a table upon said frame, horizontally disposed folding blades mounted upon said table, one of said blades having openings in its edge, a longitudinally movable bar mounted in a recess in the table and connected to one of said horizontally disposed blades, an operating shaft, a disk fixed thereto provided with a cam groove, a link pivoted to said bar, a pin carried by the link engaging said groove, top folding blades movable through the openings in said horizontally disposed blade, a rock shaft, arms connected thereto and adapted to actuate said top folding blades, means for rocking said shaft, side folding blades, and a plunger for ejecting a folded article.

7. An automatic apparatus for wrapping articles, comprising a frame having a well therein, a table upon said frame, horizontally disposed folding blades mounted upon said table, one of said blades having openings in its edge, a longitudinally movable bar mounted in a recess in the table and connected to one of said horizontally disposed blades, an operating shaft, a disk fixed thereto provided with a cam groove, a link pivoted to said bar, a pin carried by the link engaging said groove, top folding blades movable through the openings in said horizontally disposed blade, a rock shaft, arms connected thereto and adapted to actuate said top folding blades, means for rocking said shaft, side folding blades, pivotal bars upon which said side folding blades are mounted, a pivotal disk having cam slots therein, screws carried by said blade carrying plates and engaging said slots, a plunger, and means for moving the same and rocking said disk.

8. An automatic apparatus for wrapping articles, comprising a frame having a well therein, a table upon said frame, horizontally disposed folding blades mounted upon said table, one of said blades having openings in its edge, a longitudinally movable bar mounted in a recess in the table and connected to one of the horizontally disposed blades, an operating shaft, a disk fixed thereto provided with a cam groove, a link pivoted to said bar, a pin carried by the link engaging said groove, top folding blades movable through the openings in said horizontally disposed blade, a rock shaft, arms connected thereto and adapted to actuate said top folding blades, means for rocking said shaft, side folding blades, pivotal bars upon which said side folding blades are mounted, a pivotal disk having cam slots therein, screws carried by said blade carrying plates and engaging said slots, a pivotal plunger, a sliding bar upon which the latter is mounted, a rock shaft, an arm connecting the same with said plunger carrying plate, connections between said arm and disk, and mechanism for operating said arm carrying rock shaft.

9. An automatic apparatus for wrapping articles, comprising a frame having a well therein, a table upon said frame, horizontally disposed folding blades mounted upon said table, one of said blades having openings in its edge, a longitudinally movable bar mounted in a recess in the table and connected to one of the horizontally disposed blades, an operating shaft, a disk fixed thereto provided with a cam groove, a link pivoted to said bar, a pin carried by the link engaging said groove, top folding blades movable through the openings in said horizontally disposed blade, a rock shaft, arms connected thereto and adapted to actuate said top folding blades, means for rocking said shaft, side folding blades, pivotal bars upon which said side folding blades are mounted, a pivotal disk having cam slots therein, screws carried by said blade carrying plates and engaging said slots, a pivotal plunger, a sliding bar upon which the latter is mounted, a rock shaft, an arm connecting the latter with said plunger carrying plate, connections between said arm and disk, an operating shaft, a disk fixed thereto, an anti-friction roller eccentrically mounted upon the latter, a plate fixed to the arm carrying rock shaft and having a cam groove in which said anti-friction roller is mounted.

10. In an apparatus for automatically wrapping articles, in combination with a frame having a table and a well opening, means for feeding intermittently a wrapping paper over the well, a knife for severing the wrapping paper when the latter is at rest, blades and means for operating the same to fold the flaps about the ends of the article when in said well, a plate movable upon the bottom of said frame, lugs projecting from said plate and guided in a slot in the frame, a plunger pivotally connected to said plate, and means for reciprocating the plunger to eject a wrapped article.

11. In an apparatus for automatically wrapping articles, in combination with a frame having a table and a well opening, means for feeding intermittently a wrapping paper over the well, a knife for severing the wrapping paper when the latter is at rest, blades and means for operating the same to fold the flaps about the ends of the article when in said well, a plate movable upon the bottom of said frame, lugs projecting from said plate and guided in a slot in the frame, a plunger pivotally connected to said plate, the bottom of said frame having a recess, a slotted covering to said recess, lugs fixed to said plate and movable within the slot of said covering, and means for reciprocating the plate.

12. In an apparatus for automatically wrapping articles, in combination with a frame having a table and a well opening, means for feeding intermittently a wrapping paper over the well, a knife for severing the wrapping paper when the latter is at rest, blades and means for operating the same to fold the flaps about the ends of the article when in said well, a plate movable upon the bottom of said frame, a plunger pivotally connected to said plate, the bottom of said frame having a recess, a slotted covering to said recess, lugs fixed to said plate and movable within the slot of said covering, and means for actuating the folding blades during the movement of said ejecting plunger.

In testimony whereof we hereunto affix our signatures in the presence of two witnesses.

JOHN H. FELMLEE.
EMANUEL FELUMLEE.

Witnesses:
THOMAS J. HERMAN,
DAVID L. BUCHANAN.